United States Patent [19]

MacDonald, Jr.

[11] 4,183,452
[45] Jan. 15, 1980

[54] BUGGY CARRIER

[76] Inventor: Walter F. MacDonald, Jr., 511 Menauhant Rd., E. Falmouth, Mass. 02536

[21] Appl. No.: 832,390

[22] Filed: Sep. 12, 1977

[51] Int. Cl.² ............................................. B60R 9/06
[52] U.S. Cl. .................................. 224/273; 224/319; 224/324
[58] Field of Search ....... 224/29 R, 42.03 R, 42.03 A, 224/42.03 B, 42.06, 42.07, 42.1 E, 42.12, 42.13, 42.15, 42.26, 42.43, 42.44, 42.45 R, 42.46 R, 273, 309, 310, 317, 319, 324, 325, 326, 330; 211/17, 18, 19, 20, 23, 24; 214/451, 452; 105/367; 414/463, 464

[56] References Cited

U.S. PATENT DOCUMENTS

| | | | |
|---|---|---|---|
| 626,535 | 6/1899 | Gradlmiller | 105/367 X |
| 672,070 | 4/1901 | Smith | 105/367 X |
| 1,609,466 | 12/1926 | Dempsey | 224/29 R |
| 1,778,771 | 10/1930 | Pritchard | 224/42.43 |
| 2,797,852 | 7/1957 | Michalski | 224/42.45 R |
| 3,972,457 | 8/1976 | Kesler | 224/42.13 X |

FOREIGN PATENT DOCUMENTS

| | | | |
|---|---|---|---|
| 193203 | 2/1938 | Switzerland | 211/17 |
| 283833 | 1/1928 | United Kingdom | 211/20 |

*Primary Examiner*—Trygve M. Blix
*Assistant Examiner*—Winston H. Douglas
*Attorney, Agent, or Firm*—Wolf, Greenfield & Sacks

[57] ABSTRACT

The carrier is for supporting a fine harness or pleasure sulky from the tail gate of a horse trailer and comprises a pair of support members each of which may be of the same construction and disposed vertically and spaced from each other along the tail gate. Each support member includes a main support brace having an interlocking bracket disposed therealong and fitting over the top edge of the tail gate to provide the main support for the brace. The bottom end of the support brace is preferably removably secured in a bracket on the bottom of the tail gate. Depending on the type of buggy being carried, one or more U-shaped arcuate wheel holders extend from the support brace for accommodating a wheel of the buggy. The buggy is also preferably strapped into the carrier.

9 Claims, 7 Drawing Figures

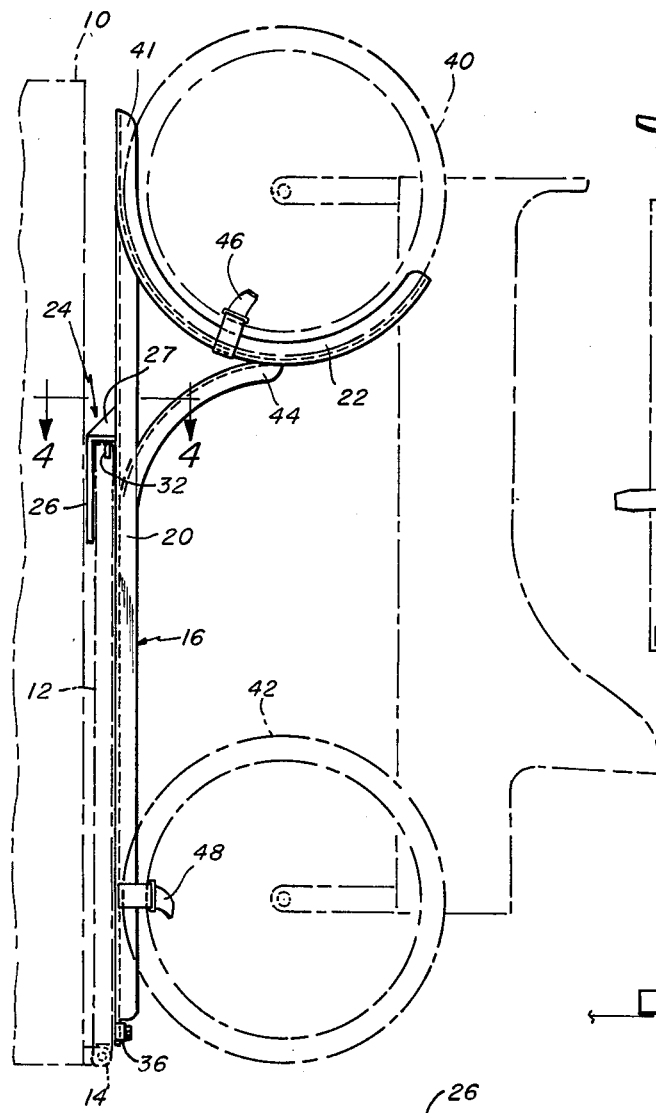
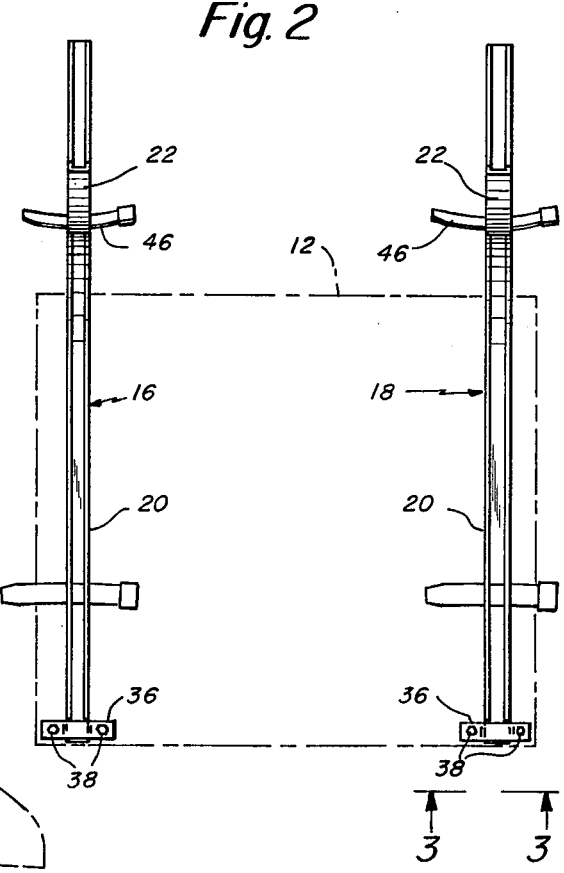
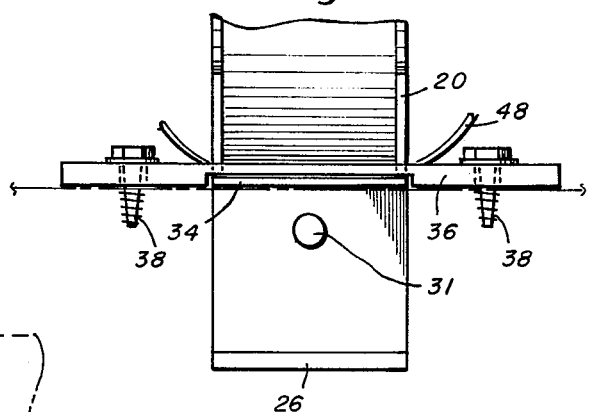
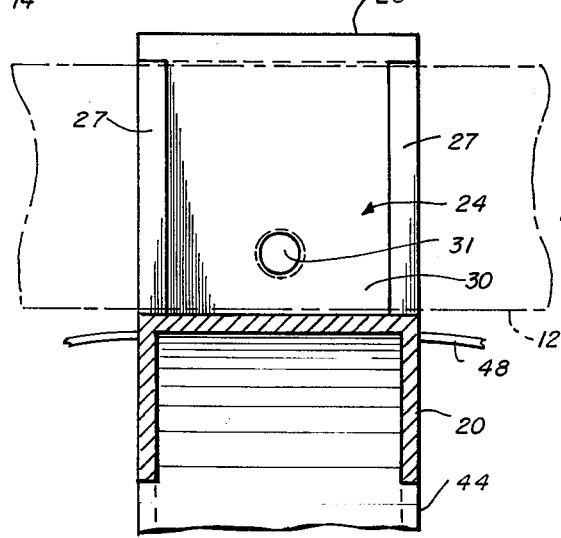

BUGGY CARRIER

BACKGROUND AND SUMMARY OF THE INVENTION

The present invention relates in general to a carrier for a horse-drawn vehicle and pertains, more particularly, to a buggy carrier wherein the carrier is used for supporting the buggy from the tail gate of a horse trailer.

Horses, and in particular show horses are usually transported in a four-wheel trailer which accommodates two horses side-by-side and which may be drawn by an automobile or a truck. Along with the transportation of the horse or horses it is also necessary to transport a sulky or buggy. In the past the buggy has not been transported in a very efficient manner. Many times the buggy is transported on top of the motor vehicle or the owner of the horse finds it almost necessary to use a truck to pull the horse trailer carrying the buggy in the bed of the truck itself.

Accordingly, it is an object of the present invention to provide an improved means for carrying a buggy or sulky without the need of transporting the buggy on the motor vehicle itself. In accordance with the invention support braces are provided engageable with the tail gate of the horse trailer and having means for accommodating the buggy or sulky supported therefrom along the back end of the horse trailer.

Another object of the present invention is to provide a buggy carrier in accordance with the preceding object and which is constructed to readily receive different types of buggies such as either two-wheel or four-wheel buggies.

To accomplish the foregoing and other objects of this invention the carrier is supported from the tail gate of a horse trailer and comprises a pair of support braces, each of which is somewhat elongated and each of which may be of substantially the same construction. Along the length of each brace there is provided a bracket means for supporting the brace in a generally vertical direction from the tail gate. In the preferred construction a hook-like bracket is used extending over the top of the tail gate for supporting each brace. In addition, preferably a U-shaped bracket is provided on the bottom of the tail gate into which a bottom edge of each support brace fits. Channel means extend from each brace and the channel means is preferably of a shape conforming to the arcuate shape of the wheels resting in the channel means. Each of these channel means is disposed on the support brace at approximately the same elevation therealong so as to support the buggy in an upright position. Strap means are provided for securing the buggy both to the support braces and also to the channel means.

In the basic embodiment of the present invention, one channel means is provided in association with each support brace. However, in an alternate embodiment, two channel means may be associated with each support brace, one disposed above the other at a spacing corresponding substantially to the spacing between the front and rear wheels of a four-wheel buggy such as the fine harness buggy. In still another embodiment, the channel means may be disposed at a bottom end of the brace rather than at the preferred top end of the brace. In still another embodiment the channel means may be adjustable along the length of the support brace.

DESCRIPTION OF THE DRAWINGS

Numerous other objects, features, and advantages of the invention should now become apparent upon a reading of the following detailed description taken in conjunction with the accompanying drawings, in which:

FIG. 1 is a side elevation view of one of the support braces of the present invention showing a buggy, in phantom;

FIG. 2 is a rear elevation view showing the pair of support braces secured from the tail gate of the horse trailer;

FIG. 3 is a bottom view taken along line 3—3 of FIG. 2 showing the manner in which the support brace is secured at its bottom end;

FIG. 4 is a cross-sectional view taken along line 4—4 of FIG. 1;

DETAILED DESCRIPTION

Figure 5:
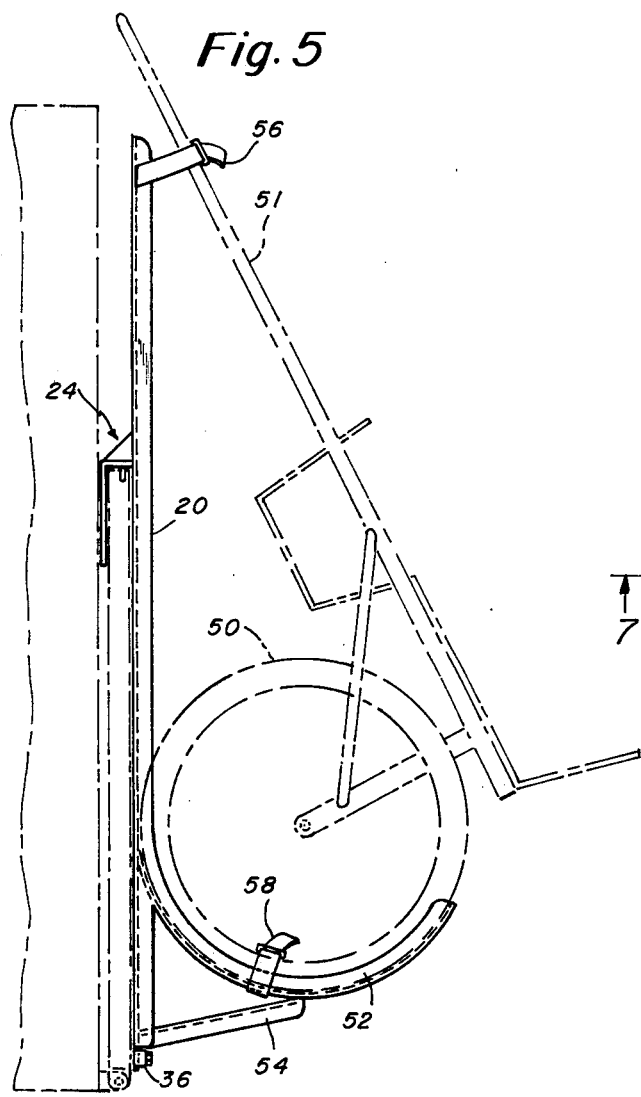
FIG. 5 is a side elevation view of an alternate embodiment of the invention with the channel means at the bottom end of the support brace and showing a two-wheel buggy in phantom.

The carrier of this invention comprises two separate support members which may be substantially identical and one of which is shown in FIG. 1. Both of these members are adapted to interlock with the tail gate of a horse trailer and are for supporting a buggy such as a pleasure buggy or fine harness buggy from the horse trailer.

FIG. 1 shows in phantom the horse trailer 10 having its rear tail gate 12 shown pivotally connected to the horse trailer at its bottom end 14. The horse trailer may be of conventional design and has associated with it, not shown in FIG. 1, means for locking the tail gate in a secure vertical position as depicted in FIG. 1. The carrier of this invention is supported from the tail gate of the horse trailer 10.

One embodiment of the present invention is shown in FIGS. 1-4. The carrier in this embodiment comprises upright support members 16 and 18 each of which is substantially of the same construction. Each support member comprises an elongated, channel-shaped support brace 20, and arcuately-shaped channel member 22 supported from the top end of the support brace 20. The support brace 20 is supported at two points from the tail gate. For this purpose there is provided an interlocking bracket 24 having a downwardly depending leg 26 for fitting on the inside surface of the tail gate as shown in FIG. 1. The bracket 24 may be secured to the brace 20 in any well known manner such as by being bolted thereto or by being welded to the brace. The bracket 24, in addition to the downwardly depending leg 26 also includes side flanges 27 which adds some strength to the bracket. The wall 30 of bracket 24 also has an aperture 31 for receiving a pin 32 or the like for securing the support brace to the tail gate of the trailer.

The very bottom of the support brace 20 has its side walls cut away to provide an end lip 34, as shown in FIG. 3, that fits within an accommodating slot in the bracket 36. The bracket 36 may be secured to the bottom end of the tail gate in the position shown in FIG. 2 by means of sheet metal screws 38 as depicted in FIG. 3.

The support members 16 and 18 are normally disengaged from the horse trailer until the horses have been loaded into the trailer. After the tail gate has been secured in a locked position each of the members 16 and 18 may then be positioned on the tail gate. To accomplish this the bottom lip 34 is inserted in the bracket 36 essentially at the same time that the bracket 24 is fitted over the top edge of the tail gate. FIG. 1 shows the final position of the support member with the bracket 24 resting upon the top of the tail gate with the bottom lip 34 engaged securely within the bracket 36. A pin or other securing means 32 may then be interconnected between the bracket 24 and the tail gate so as to prevent any lifting of the support member from the tail gate. The pin 32 may alternatively be a threaded bolt that extends through the bracket into a threaded receptacle provided in the tail gate. On the other hand it is possible to use the carrier of this invention without the requirement of using locking pins with the tail gate as the weight of the buggy itself would make it quite difficult for the carrier to move upwardly sufficiently to disengage from the tail gate.

The channel member 22 has an essentially U-shaped cross section and is shaped arcuately as depicted in FIG. 1 so as to substantially conform to the shape of the buggy wheel 40. The end 41 of the channel member is secured to the brace 20 such as by being welded thereto. Because the channel member 22 extends outwardly from the brace a substantial distance, there is preferably provided a further support channel 44 which is welded between the channel member 22 and the upright support brace 20.

FIG. 1 shows the manner in which the buggy rests in the carrier with one wheel in each of the channel members 22. There is also preferably provided a strap 46 for securing wheel 40 to the channel member 22 and a second strap 48 passing through a slot in the brace 20 and about the other wheel 42 so as to securely hold the buggy in place in its carrier.

Figure 6:
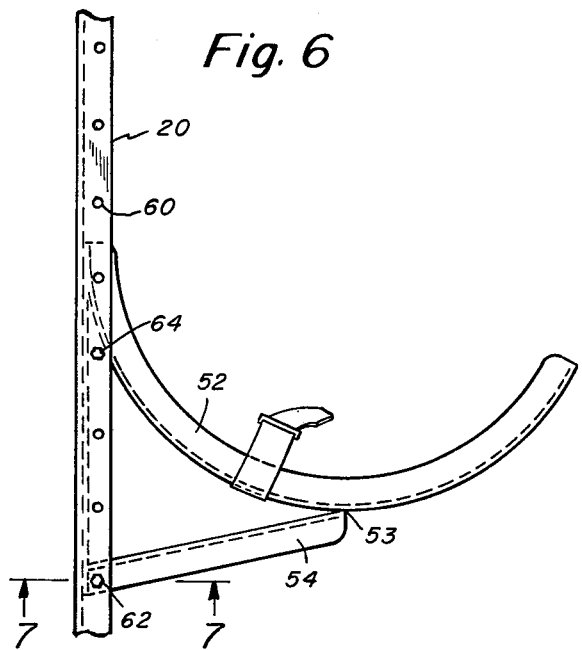
FIG. 6 is a fragmentary view of still another embodiment of the present invention wherein the channel for the buggy wheels is adjustable in a vertical direction.
Figure 7:
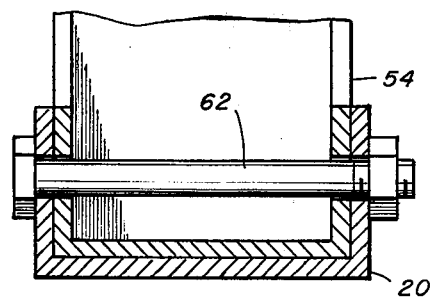
FIG. 7 is a cross-sectional view taken along line 7—7 of FIG. 6.

In FIGS. 5-7 like reference characters will be used throughout to identify like parts previously shown and discussed with reference to FIGS. 1-4. In FIG. 5 there is shown in phantom a two-wheel pleasure buggy, showing a wheel 50 resting on the carrier. In the embodiment of FIG. 5 the support brace 20, bracket 24 and bracket 36 are all substantially of the same design as depicted in FIG. 1. However, in FIG. 5 there is now provided a channel member 52, quite similar to the channel member 22 shown in FIG. 1, but supported at a lower end of the support brace 20. The channel member 52 may be supported by being welded with the support brace 20. A further support member 54 is welded between the very bottom end of the brace 20 and the channel member 52 for providing adequate support for the channel member 52. In order to hold the buggy in place there are provided straps 56 and 58. The strap 56 is secured from the top end of the support brace 20 and extends about the front end 51 of the buggy. The strap 58 extends about the wheel 50 and the channel member 52. Straps would of course be provided in association with the other support member 18.

FIGS. 6 and 7 show an alternate arrangement of the invention wherein the channel member is adjustable. FIG. 6 shows a fragmentary portion of the support brace 20 and also depicts the channel member 52 and its associated support 54. The channel member 52 and support 54 may be welded at 53 so that they are essentially a single unit. Each of these members has holes such as shown in FIGS. 6 and 7 for alignment with vertically spaced holes 60 along the support brace 20. Of course, both channel members associated with each of the support members would be adjustable in a similar manner so that they could be adjusted to the same horizotally-aligned position.

FIG. 7 shows one arrangement for securing the channel member in place by means of a bolt 62 passing through aligned holes in the support member 54 and the brace 20. In the embodiment shown in FIG. 7 the support 54 fits within the brace 20 and the bolt 62 secures both of these components together. A similar bolt may also be provided, shown in FIG. 6 as bolt 64, securing the top end of the channel member 52 to the upright support brace 20. The channel member 52 may be moved in a vertical direction simply by moving the bolts 62 and 64 and moving the channel member to any desired position.

Having described a limited number of embodiments of the present invention it should now be apparent to those skilled in the art that numerous other embodiments are contemplated as falling within the scope of this invention. For example, two channel members may be associated with each support 20 spaced from each other. As this relates to FIG. 1 a second channel member might have been provided for supporting the lower disposed buggy wheel.

What is claimed is:

1. A buggy carrier supported from the tail gate of a horse trailer, comprising;

a pair of support braces each of elongated shape having a length greater than the height of the tail gate to extend at least partially thereabove and each having means disposed along the length spaced from the ends to support the brace in a generally vertical direction from the tail gate with the braces extending substantially normal to the top edge defining the tail gate, said means to support each brace including a bracket defining an opening for fitting the top end of the tail gate of the trailer, means extending from each brace for receiving a wheel of the buggy so as to support the wheel in an upright position with a portion of the buggy supported above the tail gate top edge, securing means at the bottom of the tail gate for securing the bottom end of the support brace against the tail gate, and means for fastening the buggy to the braces, said means for receiving a wheel including a U-channel member having an arcuate shape corresponding substantially to the shape of the wheel and extending substantially tangentially to the elongated brace in a vertical direction, said means for fastening the buggy including at least one strap means associated with the U-channel member extending about the U-channel member and the wheel mounted therein and disposed in the U-channel member for holding the wheel securely in the U-channel member.

2. A buggy carrier as set forth in claim 1 wherein the bracket has a downwardly depending leg defining with the support brace said opening so that the support brace rests on the outer surface of the tail gate while the leg rests on the inner surface of the tail gate.

3. A buggy carrier as set forth in claim 2 wherein said bracket has a wall resting on the top of the tail gate to limit the position of the support brace relative to the tail gate.

4. A buggy carrier as set forth in claim 1 wherein the support brace has a bottom lip fitted in a slotted bracket on the tail gate to secure the brace to the tail gate.

5. A buggy carrier as set forth in claim 1 wherein the U-channel member is disposed at the top of the support brace.

6. A buggy carrier as set forth in claim 1 including two U-channel members for each support brace.

7. A buggy carrier as set forth in claim 1 wherein the U-channel member is adjustable along the support brace so as to accommodate wheels of a four wheel buggy when in an upper position and wheels of a two wheel buggy when in a lower position, said upper position being above the brace support means and said lower position being below the brace support means.

8. A buggy carrier as set forth in claim 1 wherein the means supporting the brace supports the brace from the top of the tail gate and said means for receiving a wheel is disposed thereabove.

9. A buggy carrier as set forth in claim 1 wherein the support brace comprises a channeled piece.

* * * * *